United States Patent [19]
Gentry et al.

[11] Patent Number: 5,567,213
[45] Date of Patent: Oct. 22, 1996

[54] USE OF OLEFINIC IMINES TO SCAVENGE SULFUR SPECIES

[75] Inventors: David R. Gentry; Gerald T. Pancio, both of St. Louis; Jerry J. Weers, Ballwin, all of Mo.

[73] Assignee: Petrolite Corporation, St. Louis, Mo.

[21] Appl. No.: 636,813

[22] Filed: Apr. 25, 1996

Related U.S. Application Data

[63] Continuation of Ser. No. 430,208, Apr. 27, 1995.

[51] Int. Cl.$^6$ .................................................. C10L 1/22
[52] U.S. Cl. ............................................ 44/420; 44/421
[58] Field of Search ...................................... 44/420, 421

[56] References Cited

U.S. PATENT DOCUMENTS

| | | | |
|---|---|---|---|
| 2,055,810 | 9/1936 | Bartram | 44/9 |
| 2,700,682 | 1/1955 | Blomberg | 260/566 |
| 2,701,187 | 2/1955 | Pitman | 44/63 |
| 4,003,719 | 1/1977 | McCoy et al. | 44/63 |
| 4,149,966 | 4/1979 | O'Donnell et al. | 208/237 |
| 4,778,609 | 10/1988 | Koch et al. | 252/32.5 |
| 5,162,049 | 11/1992 | Bostick et al. | 44/336 |
| 5,169,411 | 12/1992 | Weers | 44/421 |
| 5,223,127 | 6/1993 | Weers et al. | 208/236 |
| 5,266,185 | 11/1993 | Weers et al. | 208/47 |
| 5,284,576 | 2/1994 | Weers et al. | 208/236 |
| 5,336,277 | 8/1994 | Poirier et al. | 44/343 |
| 5,352,377 | 10/1994 | Blain et al. | 252/51.5 |

FOREIGN PATENT DOCUMENTS

0618284A1  10/1994  European Pat. Off. ........ C10L 10/04

OTHER PUBLICATIONS

Pryor, William A. *Mechanisms of Sulfur Reactions*, McGraw-Hill, New York, 1962 (month N/A).
Voronkov, M. G.; Vyazankin, N. S.; Deryagina, E. N.; Nakhmanovich, A. S.; and Usov, V. A., *Reactions of Sulfur with Organic Compounds*, Consultants Bureau, New York, 1987 (month N/A).

*Primary Examiner*—Ellen M. McAvoy
*Attorney, Agent, or Firm*—Kenneth Solomon

[57] ABSTRACT

A method for scavenging sulfur species from a petroleum-derived medium is disclosed. The method comprises contacting the medium with sulfur species scavenging amount of an imine of the formula $$R'[N{:}C{-}R]_x,$$
$$\underset{R_1}{|}$$

wherein x is an integer from 1 to 10, R' is an organic moiety having a number of valences equal to x, $R_1$ is hydrogen or a mono-valent organic moieties and R is a mono-valent olefin moiety, provided that R and $R_1$ contain a total of from about four to about forty carbon atoms. In an alternative embodiment, the imine is produced by a condensation reactionic between an amine having at least one primary amino group and a carbonyl of the formula $$\underset{R_1CR'}{\overset{O}{\|}}$$

wherein $R_1$ is hydrogen or a mono-valent organic moieties and R is a mono-valent olefin moiety, provided that R and $R_1$ contain a total of from about four to about forty carbon atoms. In yet other embodiments, the imine is produced by a condensation reaction between an amine having at least one primary amino group and an aldehyde having at least one alpha-hydrogen in an aldehyde to primary amino group molar ratio of at least about 2:1, are also disclosed.

25 Claims, No Drawings

USE OF OLEFINIC IMINES TO SCAVENGE SULFUR SPECIES

This is a continuation application of U.S. patent application Ser. No. 08/430,208, filed Apr. 27, 1995, now allowed.

BACKGROUND OF THE INVENTION

1. Field of the Invention

The present invention relates to scavenging of sulfur species, and more particularly to use of particular imines for scavenging such species as sulfides and elemental sulfur from petroleum-derived media.

2. Description of the Prior Art

Petroleum-derived media, such as crude oil, residuum, various refinery fractions and finished fuels, often contain hydrogen sulfide or elemental sulfur or both. The presence of these sulfur species creates a variety of problems. For example, hydrogen sulfide is a very toxic gas, with a disagreeable "rotten egg" smell. Its liberation from a medium in which it is dissolved, for example, during storage or transport of the medium can raise serious environmental and health problems.

In response to such problems, a variety of hydrogen sulfide scavengers have been developed. For example, U.S. Pat. No. 5,169,411 to Weers, a co-inventor herein, describes a class of such scavengers for crude, residua and petroleum fuel media. These scavengers inhibit liberation of hydrogen sulfide from the media, generally by reaction with the hydrogen sulfide to form a new sulfur compound that is resistant to evolution as a gas. Preferably, the new sulfur compound is stable at high temperatures so that inhibition of hydrogen sulfide liberation is maintained even in high temperature situations. Moreover, it is, of course, desirable that such characteristics be associated with a scavenger that is inexpensive to manufacture.

However, the presence of other sulfur species besides hydrogen sulfide raises serious problems as well. Thus, the presence of elemental sulfur in a fluid can cause corrosion of metals contacted by the fluid. For example, fuels often contain elemental sulfur, and in fuels such as gasoline, the elemental sulfur attacks the copper commutator of fuel pump motors contacted by the gasoline, leading to early wear of the commutator. Accordingly, agents that scavenge elemental sulfur as well as hydrogen sulfide are desired.

Nevertheless, it has been found that efficacy in scavenging hydrogen sulfide is not indicative of scavenging efficacy with respect to other sulfur species such as elemental sulfur. For example, a commercial product that corresponds to that of Test 10 of U.S. Pat. No. 5,169,411 has been found to be ineffective in scavenging elemental sulfur, or at least not nearly as effective as desired. Not only that, but the noted commercial product has been found to have an offensive odor, making its handling troublesome and its use undesirable in many situations. Yet, other conventional scavengers are so far from ideal that the superior hydrogen sulfide scavenging efficacy and other desirable characteristics of the scavenger of that Test 10 make it a popular scavenger in the petroleum refining industry despite those drawbacks.

As shown by U.S. Pat. Nos. 4,149,966 and 5,336,277, scavengers directed specifically to elemental sulfur also have been developed. However, scavenging such as by the methods of those patents involves addition of even more sulfur species (organomercaptans), which is undesirable, particularly in view of the offensive smell typically imparted to compositions by addition of mercaptans. Moreover, at least in the case of U.S. Pat. No. 4,149,966, scavenging is not accomplished by simple addition of a chemical scavenger. Rather, further process steps and equipment are required. Also, prior art additives for scavenging elemental sulfur may produce hydrogen sulfide, therefore requiring addition of a hydrogen sulfide scavenger in addition to the elemental sulfur scavenger.

Therefore, industries have continued their searches for ever better scavengers having desirable handling characteristics, including a non-offensive odor, low cost, high efficacy in scavenging elemental sulfur as well as hydrogen sulfide, and the capability of inhibiting evolution of hydrogen sulfide even at high temperatures.

SUMMARY OF THE INVENTION

The present invention, therefore, is directed to a novel method for scavenging sulfur species from a petroleum-derived medium. The method comprises adding to the medium an effective amount of a composition containing an imine of the formula

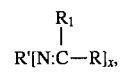

preferably (a)

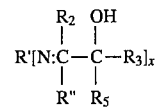

or (b)

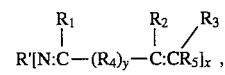

wherein x is an integer from 1 to 10, y is 0 or 1, R' is an organic mono- or poly-valent moiety in which the number of valences equals x, R", $R_1$, $R_2$, $R_3$ and $R_5$ are independently selected from among hydrogen and mono-valent organic moieties, and $R_4$ is a di-valent organic moiety, and if the structure of the imine corresponds to (a), at least one of R", $R_2$, $R_3$ and $R_5$ is an olefin moiety.

The present invention is also directed to a novel method for scavenging sulfur species from a petroleum-derived medium in which the method comprises adding to the medium an effective amount of a composition produced by a condensation reaction between an amine having at least one primary amino group and a carbonyl of the formula

wherein $R_1$ is hydrogen or a mono-valent organic moiety and R is a mono-valent olefin moiety, provided that R and $R_1$ contain a total of about four to about forty carbon atoms.

The present invention is further directed to a novel method for scavenging sulfur species from a petroleum-derived medium in which the method comprises adding to the medium an effective amount of a composition produced by a condensation reaction between an amine having at least one primary amino group and a ketone or, more preferably, an aldehyde having at least one alpha-hydrogen in a ketone or aldehyde to primary amino group molar ratio of at least about 2:1.

3

Among the several advantages of this invention, may be noted the provision of a method for scavenging elemental sulfur as well as hydrogen sulfide; the provision of such method that is low cost; the provision of such method that does not involve the use of a scavenger having an offensive odor; and the provision of such method that inhibits liberation of hydrogen sulfide even at elevated temperatures.

DETAILED DESCRIPTION OF THE PREFERRED EMBODIMENTS

In accordance with the present invention, it has been discovered that a compound that is a combination of an imine functionality and an olefin functionality are surprisingly effective scavengers of not only hydrogen sulfide, but elemental sulfur as well. Thus, the imines may be represented by the formula

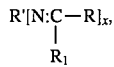

wherein x is an integer from 1 to 10, R' is an organic moiety having a number of valences equal to x, $R_1$ is hydrogen or a mono-valent organic moiety and R is a mono-valent olefin moiety, provided that R and $R_1$ contain a total of from four to about forty carbon atoms. However, particularly effective imines have been found to be those of the formula (a)

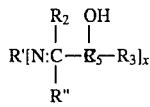

and those of the formula (b) $R'[N:C(R_1)—(R_4)_y—C(R_2):C(R_3)R_5]_x$, wherein x is an integer from 1 to 10, y is 0 or 1, R' is an organic mono- or poly-valent moiety in which the number of valences equals x, and $R_1$, $R_2$, $R_3$ and $R_5$ are independently selected from among hydrogen and organic moieties, $R_4$ is a divalent organic moiety and, if the imine corresponds to the formula (a), at least one of R", $R_2$, $R_3$, and $R_5$ is an olefin moiety. As used herein the phrase "olefin moiety" encompasses not only unsubstituted olefins, but also substituted olefins in which one or more hydrogens is substituted with a non-acidic group, such as hydroxyl, ether, ester and tertiary nitrogen groups.

The effectiveness of such imines is especially surprising in view of the fact that while such imines fall within the broad class of imines disclosed by U.S. Pat. No. 5,169,411, other imines that also fall within that broad class, such as the imine of Test 10 of that patent, have been found to be ineffective against elemental sulfur. Moreover, the compositions of this invention also have been found in many cases to be even better hydrogen sulfide scavengers than the imine of the noted Test 10, which itself has been considered an excellent hydrogen sulfide scavenger. Further, in contrast to the imine of the noted Test 10, which has an offensive odor, imines of this invention that in fact have a rather pleasant odor may be selected. In addition, scavengers of this invention may be produced at relatively low cost, show high efficacy in scavenging elemental sulfur as well as hydrogen sulfide, and inhibit evolution of hydrogen sulfide even at high temperatures.

Imines of this invention may be produced by conventional means. In the case of the imines characterized by the structures (a) and (b), above, they may be produced by reaction of a primary amine and an unsaturated ketone or aldehyde, which in turn may be produced by a reaction, such as an aldol condensation reaction of one or more saturated or unsaturated ketone or aldehyde, aldehydes having been found to be more reactive and so being preferred.

Thus, exemplary imines of this invention derived via aldol condensation may be referred to alternatively as an aldimine or an aldolimine. If the unsaturated ketone or aldehyde is produced by an aldol condensation reaction, such reaction need not be conducted separately from the reaction with the primary amine, however. For example, an unsaturated ketone or aldehyde may be produced in a separate aldol condensation reaction and the unsaturated aldehyde produced from that reaction may be reacted with the primary amine, or a saturated or unsaturated ketone or aldehyde may be added slowly to a primary amine and the amine may act as a catalyst for the aldol condensation reaction to form an unsaturated ketone or aldehyde which then reacts with the amine.

The unsaturated ketone or aldehyde may be of the formula

wherein $R_1$ is hydrogen or a mono-valent organic moiety and R is a mono-valent olefin moiety. Preferably, the unsaturated ketone or aldehyde corresponds to the formula

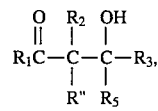

wherein R", $R_2$, $R_3$ and $R_5$ are each hydrogen or a mono-valent organic moiety, at least one of which is an olefin moiety, or the formula $O:C(R_1)—(R_4)_y—C(R_2):C(R_3)R_5$ wherein y is 0 or 1, $R_1$, $R_2$, $R_3$ and $R_5$ are independently selected from among hydrogen and mono-valent organic moieties (especially from among hydrogen and mono-valent aliphatic moieties), and $R_4$ is a di-valent organic moiety (especially a di-valent aliphatic moiety). In the preferred embodiment, $R_1$ is hydrogen, such that the compound is an unsaturated aldehyde.

As noted, the compound may be prepared by aldol condensation and if not in resulting structure (b), y is 0. If y is 1 in structure (b), however, $R_4$ preferably is relatively short, such as at most about six carbon atoms, most preferably an alkylene or di-valent alkene (which may be an alkadiene or alka-poly-ene). For example, $R_4$ may be —$C(R_6):C(R_7)$—, or —$C(R_6)(R_7)C(R_8):C(R_9)$—, or —$C(R_6):C(R_7)C(R_8):C(R_9)$—, or $:C(R_6)(R_7)$, or the like, wherein $R_6$, $R_7$, $R_8$ and $R_9$ are independently selected from among hydrogen and organic moieties, especially alkyls, alkenyls or alcohols of up to about six (preferably up to about three) carbon atoms. Thus, it is believed that proximity of the carbonyl double bond and a carbon-carbon double bond is desirable, with conjugation of the double bonds being most desirable.

It is also preferred that each of R", $R_1$, $R_2$, $R_3$ and $R_5$ is hydrogen or an organic moiety of no more than about eighteen carbon atoms, preferably hydrogen or an organic moiety up to about twelve carbon atoms, even more preferably hydrogen or an organic moiety of up to about six carbon atoms. Desirably, the organic moieties are aliphatic moieties (which may be substituted, such as by a nonacidic group, for example a hydroxyl, ether, ester or tertiary nitrogen group, in place of one or more hydrogen). Most preferably, each is hydrogen or an aliphatic alcohol or an alkyl moiety, such as up to about six carbon atoms. It is also desirable that the unsaturated aldehyde have a total of at most about eighteen carbon atoms, more desirably at most about twelve carbon atoms, most desirably about four to about ten carbon atoms.

In the preferred embodiments of the formula

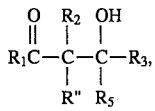

all but one of $R_1$, $R''$, $R_2$, $R_3$ and $R_5$ is hydrogen or alkyls of up to about six carbon atoms, while the remaining of the R's is an alkenyl up to about six carbon atoms. As noted in formula (a), at least one of $R''$, $R_2$, $R_3$ and $R_5$ is an olefin moiety.

In particularly preferred embodiments of the formula $O:C(R_1)—(R_4)_y—C(R_2):C(R_3)R_5$, $R_1$, $R_2$, $R_3$ and $R_5$ are each hydrogen or alkyls up to about six carbon atoms. For example, $R_1$ and $R_3$ may be each hydrogen, y may be 0 and $R_2$ and $R_5$ may be each alkyls of up to about six carbon atoms, such as ethyl and propyl, respectively. The unsaturated ketone or aldehyde has a total of at least about four carbon atoms, in which case it would be butenal, preferably 2-butenal. In a preferred embodiment, the compound is unsaturated aldehyde 2-ethyl-2-hexenal.

Preparation of Unsaturated Ketone or Aldehyde

If the unsaturated ketone or aldehyde corresponds to formula (a), at least one of the starting ketones or aldehydes includes one alpha hydrogen, such that the reaction may proceed by aldol addition according to the equation

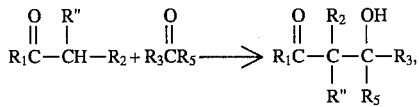

wherein

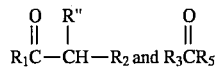

are the starting ketones or aldehydes, with the R's as defined above. If aldehydes are employed, $R_1$ is hydrogen. If a single ketone or aldehyde is used, $R_5$ is

and $R_3$ is the same as $R_1$, and the unsaturated product corresponds to

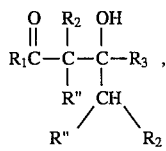

and if aldehydes are used instead of ketones, the resulting product corresponds to

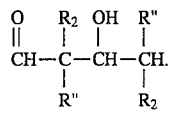

Unsaturated ketones or aldehydes corresponding to formula (b), may be prepared from an aldol condensation reaction of one or more starting ketones or aldehydes, respectively, as described below (which starting ketones or aldehydes may also include points of unsaturation). Of course, the starting ketones or aldehydes should be of the type that is capable of undergoing such reaction. Thus, the ketone or aldehyde should have two alpha-hydrogens.

In the case of a ketone, which may include two different carbon atoms having alpha-hydrogen(s), at least one of those carbon atoms should have two alpha-hydrogens. If a mixture of ketones or a mixture of aldehydes is employed as the reactants, at least one species of the mixture should include two alpha-hydrogens (on the same carbon atom) and that species should be present in a concentration relative to the other specie(s) sufficient to produce acceptable yields in view of the 1:1 molar reaction ratio wherein at least one of the reactants in that 1:1 ratio must have an alpha-hydrogen.

Accordingly, the ketones and aldehydes having two alpha-hydrogens may be represented by the formula $R_5C(R_1)O$ wherein $R_5$ is $R_2CH_2$— as defined above, and $R_1$ is as defined above and, in the case of an aldehyde, is hydrogen. Therefore, if one species is employed, since it should contain two alpha-hydrogens, it may be represented by the formula $R_2CH_2C(R_1)O$ and if an aldehyde, may be represented by the formula $R_2CH_2CHO$. If more than one species is employed, at least one should correspond to either of such formulae and the others may correspond to the formula $R_3C(R_5)O$, $R_3$ and $R_5$ having been defined above. The aldol condensation reaction may be written $R_3C(R_5)O+ R_2CH_2C(R_1)O \rightarrow R_3C(R_5):C(R_2)C(R_1)O$.

Viewed another way, all starting aldehydes and ketones may be written as $R_3C(R_5)O$. If one species is employed, $R_3C(R_5)O$ corresponds to $R_2CH_2C(R_1)O$, so $R_3$ is the same as $R_2CH_2$— and $R_1$ is the same as $R_5$. If two or more species are employed, for at least one of the species, $R_3C(R_5)O$ corresponds to $R_2CH_2C(R_1)O$. If aldehydes are employed, $R_1$ and $R_5$ are each hydrogen.

The ketone or aldehyde contains at least two carbons, and so may be at least acetaldehyde, but in a preferred embodiment, it is an aldehyde, particularly n-butyraldehyde. If this method is employed to produced the unsaturated aldehyde, y will be 0 and $R_1$ and $R_3$ will correspond to the alpha-hydrogen in the aldehyde. If one or more starting aldehyde of the formula $R_5CHO$ is used, $R_5$ in the resulting Unsaturated aldehyde will correspond to —$CH_2R_2$, y will be 0 and $R_1$ and $R_3$ will each be hydrogen (corresponding to the hydrogen in the original carbonyl group).

The aldol condensation reaction produces a carbon-carbon double bond conjugated with the carbonyl double bond. However, $R_3$ in the ketone or aldehyde formula $R_3C(R_5)O$ may be unsaturated. If so, the formation of the conjugated double bond, while preferable, is unnecessary. The $R_3$ group provides the unsaturation, albeit less desirably than is afforded by the conjugation. Thus, if $R_3$ is unsaturated, two alpha-hydrogens are not needed and the reaction, which is not a condensation reaction, may be carried out to form a product corresponding to formula (a) as discussed above.

The Amine

The amine may be almost any amine, whether a monoamine or a polyamine, that contains at least one primary amino group. In practice, however, it is expected that the amine contain no more than ten primary amino groups, typically ho more than four such groups, often one or two, especially just one, such group. Preferred amines are alkanolamines. Thus, the amine may correspond to the formula $R'(NH_2)_x$, wherein x is an integer from 1 to 10, preferably 1 to about four and most preferably 1 and R' is an organic mono- or poly-valent organic moiety in which the number of valences equals x. Preferably, R' is an alcohol group, especially an alkanol group (i.e., a hydroxyalkyl) and contains up to about eighteen carbon atoms, usually up to about twelve carbon atoms, typically up to about six carbon atoms. In a preferred embodiment, R' is hydroxyethyl, thereby making the amine monoethanolamine.

Preparation of the Imine

As noted, the imine of this invention may be prepared by reacting the unsaturated ketone or aldehyde defined above with the amine defined above, or it may be prepared by mixing the starting ketone or aldehyde with the amine. If the imine is prepared from the unsaturated ketone or aldehyde, the unsaturated ketone or aldehyde may be prepared from a starting ketone or aldehyde as defined above, or a mixture of such starting ketones or aldehydes, by addition of the starting ketone(s) or aldehyde(s) to a base such as sodium hydroxide (for example, in a ten to twenty-five percent or more by weight or five to fifteen or more mole percent aqueous solution). The base may be heated (such as to a temperature of about 80° C. to 85° C.) prior to addition of the ketone(s) or aldehyde(s), but because the reaction is exothermic, the reaction mixture can be cooled during the period of addition or the ketone(s) or aldehyde(s) may be added slowly enough (say over a period of two hours) to maintain the temperature. Generally the temperature should be maintained at about the reflux temperature of the reactants. The mixing of reactants should be carried out with agitation and the agitation and temperature maintenance may continue for two hours or so after mixing is completed, thereby allowing the aldol condensation reaction to proceed to completion to form an unsaturated ketone or aldehyde. The initial water and water produced may be removed by draining or distillation.

The resulting unsaturated ketone or aldehyde may then be mixed with an amine, preferably in a ratio of about one-half to two, such as about one, mole of ketone or aldehyde per mole of primary amino groups, such as by heating of the unsaturated aldehyde (to a temperature such as 80° C.) and adding it to the amine or vice versa. Water is removed by distillation and the reaction is allowed to proceed at about 80° C. to about 85° C. for about two hours. Further water may be removed by azeotropic distillation with an organic solvent such as xylene.

Alternatively, the starting ketone(s) or aldehyde(s) may be added to the amine under vacuum distillation for water removal. In this technique, the amine serves as a catalyst for the reaction of the ketone(s) or aldehyde(s), particularly the aldol condensation reaction, to form the unsaturated ketone or aldehyde, and then as a reagent for the imine formation. Because of the strong exotherm, the ketone(s) or aldehyde(s) should be added slowly, such as over a period of three to four hours, and the reaction mixture cooled to maintain the temperature below, for example, about 45° C. The preferred ratio of the starting ketone(s) or aldehyde(s) to amine is at least about two, but generally about one to about four, such as about 1.5 to about three, especially about two, moles of ketone or aldehyde per mole of primary amino groups. Once the exotherm disappears, the mixture may be heated, such as to about 75° to 100° C., agitated and maintained at an elevated temperature in such range for a period of several hours. Water removal may be accomplished by distillation and/or phase separation.

This alternative synthesis is less expensive than the two-step technique in which the unsaturated ketone or aldehyde is formed by condensation starting ketone(s) or aldehyde(s) in the presence of a base and then the unsaturated ketone or aldehyde is added to the amine. However, the two-step process tends to form pure dimer ketones or aldehydes, while the alternative synthesis results in a mixture of the mono-, di- and tri- forms.

The resulting imine, therefore, corresponds to the formula

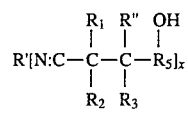

(via aldol addition) or $R'[N:C(R_1)-(R_4)_y-C(R_2):C(R_3)R_5]_x$ (via aldol condensation), as the case may be, wherein x, y, and the R's are as defined above. Thus, x is an integer from 1 to 10, y is 0 or 1, R' is an organic mono- or poly-valent moiety in which the number of valences equals x, R", $R_1$, $R_2$, $R_3$ and $R_5$ are independently selected from the group consisting of hydrogen and mono-valent organic moieties, and $R_4$ is a di-valent organic moiety and in the case of the former formula, at least one of R", $R_1$, $R_2$, $R_3$ and $R_5$ is an olefin moiety. Preferred values for these variables are as set forth above. Preferably, the imine contains at most about thirty carbon atoms, and at least about six carbon atoms.

The imine may be used directly into the medium to be treated, or it may be first diluted, such as with kerosine. For example, the additive may be a 70% by weight solution of imine in kerosine. An effective amount of the imine, that is, an amount sufficient to scavenge sulfur species, is added to the medium to be treated. The amount that would be effective for such scavenging will depend on a number of factors, including the type of sulfur species to be scavenged, the type of medium being treated and the conditions under which the medium is maintained. In practice, however, at least about 10 ppm by weight, preferably at least about 100 ppm by weight, active additive would be used. Concentrations higher than 10,000 ppm by weight may be employed; but, in general, there is not technical or commercial advantage in doing so.

The imine of this invention has been found to be useful in treating not only the media as disclosed in U.S. Pat. No. 5,169,411, but other petroleum-derived media, such as gasoline, as well. Moreover, such imines have been found to be extremely effective in scavenging elemental sulfur as well as hydrogen sulfide. Accordingly, it has been found that incorporation of such imines in gasoline extends the life of copper commutators that are contacted by the gasoline and that otherwise are attacked by elemental sulfur in the gasoline.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE 1

An imine of this invention was prepared as follows. Sodium hydroxide (50%, 0.8 g) and water (0.8 g) were added to a reactor and agitation was initiated. The diluted sodium hydroxide was then heated to about 80° C., while n-butyraldehyde (36 g) was fed over a period of about two hours—slowly enough to maintain that approximate temperature, the reflux temperature of the reactants. The temperature was maintained at about 80° to 85° C. for about two more hours after completion of the feed. The mixture was then allowed to cool, agitation was halted and the phases were allowed to separate. The aqueous phase (about 6 g), which was the lower phase, was then separated out and discarded. The upper phase (about 31.5 g), 2-ethyl-2-hexenal, was then heated to about 80° C. and monoethanolamine (15.25 g) was added over a period of about ten minutes. Next, the mixture was heated at 80° to 85° C. for about two hours and then cooled to ambient temperature. Xylenes (2.6 g) were added and the resulting mixture was distilled for the xylene/water azeotrope under water aspiration. The product represented a conversion of about 85%. The dilution of the sodium hydroxide with water produced a 25% sodium hydroxide solution. When the procedure was run without such dilution, conversion was found to be only about 30%. With the more dilute 1N sodium hydroxide solution, 100% conversion was noted, but the amount of waste water increased.

EXAMPLE 2

Monoethanolamine was charged to a reactor and butyraldehyde was added to the monoethanolamine over a three to four hour period in an aldehyde to amine weight ratio of about 7:2, with the temperature maintained at less than 45° C. with a subsurface nitrogen sparge. The riser of the reactor was closed and nitrogen was introduced to maintain the gauge pressure at about 5 psi. The reaction mass was agitated, heated to about 95° to 100° C., held in that range for four hours, and then cooled to about 40° to 50° C. under 10 psig nitrogen. Agitation was then halted and the mixture was allowed to settle for two hours. The lower water layer (about 13 to 15% of the total weight of the charges) was then drawn off and the riser was opened. Next, the mixture was heated under a nitrogen sparge to about 90° to 95° C. at about 24 to 25 inches of vacuum to distill out water (about 7 to 9% of the total weight of the charges). The yield was about 78%.

EXAMPLE 3

A sample of test scavenger was prepared by reacting under dehydration conditions monoethanolamine with n-butyraldehyde in a 1:2 molar ratio, the amine having been added to the aldehyde with stirring, and with the temperature being maintained at about 75° C. after mixing of the reactants, distillation being effected by vacuum. specimens of kerosine (50 ml) were placed into each of three separate glass bottles. Test scavenger was added to one specimen of kerosine to produce a scavenger concentration of 200 ppm. A comparison scavenger corresponding to the imine of Test 10 in U.S. Pat. No. 5,169,411 (Weers) was added one specimen of kerosine to produce a scavenger concentration of 200 ppm. The remaining specimen was left untreated. Each specimen was then doped with $H_2S$-saturated kerosine (0.5 ml), which was sufficient to bring the liquid phase level of $H_2S$ to 66 ppm in the untreated kerosine specimen. After two hours at 65° C. (150° F.), the $H_2S$ level in each of the treated specimens decreased by 26%. However, after twenty hours more, the $H_2S$ level of the kerosine specimen treated with the test scavenger had decreased 69%, while the $H_2S$ level of the specimen treated with the comparison scavenger exhibited no further reduction.

EXAMPLE 4

The procedure of Example 3, above, was repeated with gas oil in place of kerosine. After twenty hours, the $H_2S$ level in the kerosine specimen treated with the test scavenger had decreased 83%, while the $H_2S$ level of the specimen treated with the comparison scavenger had decreased 47%.

EXAMPLE 5

Three gasoline samples containing 40 mg/L elemental sulfur were tested at 40° C. for 360 hours in a fuel pump test rig containing a copper commutator, one sample having been treated with 200 mg/L of TOLAD®[1] 9702, one sample having been treated with 200 mg/L of a 50:50 mixture of Tolad 9702 and the comparison scavenger of Example 3, above, and the third sample having been treated with 200 mg/L of a 50:50 mixture of Tolad 9702 and the test scavenger of Example 3, above. The copper wear on the commutator in the first two samples was 0.020 inches. The copper commutator wear in the sample containing the test scavenger was 0.012 millimeters.

[1] *Registered trademark of Petrolite Corporation.

EXAMPLE 6

The ability of the test scavenger of Example 3, above, to react with elemental sulfur was investigated by mixing elemental sulfur (0.32 g=0.01 mole) with chloroform (30 g) and adding the test scavenger (1.69 g=0.01 mole) to the mixture. The resulting mixture was shaken and allowed to stand for several hours. A completely soluble red solution was evident and the chloroform was evaporated, leaving an oily residue. The residue was subjected to GC-MS analysis, which showed species that appeared to be the products of the insertion of sulfur into the starting test scavenger imine.

EXAMPLE 7

A sample of test scavenger prepared in accordance with Example 3, above, and compared to the comparison scavenger of Example 3, above, for 100 ppm doses in 0.25 ml samples of kerosine containing hydrogen sulfide. The following results were obtained after heating the treated samples at 65° C. for 24 hours, with the $H_2S$ content being reported in ppm:

| Scavenger | Final $H_2S$ Content | % $H_2S$ Removed |
| --- | --- | --- |
| None | 15.0 | 0 |
| Comparison | 5.7 | 62 |
| Test | 5.1 | 66 |
| None | 15.5 | 0 |
| Comparison | 6.7 | 57 |
| Test | 4.2 | 73 |

The test was repeated with light cycle gas oil in place of the kerosine with the following results:

| Scavenger | Final H₂S Content | % H₂S Removed |
| --- | --- | --- |
| None | 12.6 | 0 |
| Comparison | 7.0 | 44 |
| Test | 8.6 | 32 |

EXAMPLE 8

Samples (500 ml) of fuel were tested in 1-L nitrogen-flushed cans by dosing the samples with scavenger (50 microliters; equal to 100 ppm), the scavenger being either the test scavenger or the comparison scavenger of Example 3, above, and 1.5 ml of kerosine containing hydrogen sulfide. In one set of samples, each sample was shaken for one minute at 300 rpm and allowed to stand for three days at ambient temperature. In a second set of samples equivalent to the first set, each sample was heated for four hours at 65° C. This procedure was carried out for two runs. For the third run, light cycle gas oil was used in place of kerosine. The following results were obtained, with the final H₂S contents being vapor phase concentrations reported in ppm.

| | | Final H₂S Content | |
| --- | --- | --- | --- |
| Run | Scavenger | First Set | Second Set |
| 1 | None | 1150 | 1200 |
| 1 | Comparison Scavenger | 640 | 520 |
| 1 | Test Scavenger | 50 | 20 |
| 2 | None | 1450 | 1280 |
| 2 | Comparison Scavenger | 700 | 800 |
| 2 | Test Scavenger | 950 | 770 |
| 3 | None | 900 | 1000 |
| 3 | Comparison Scavenger | 500 | 500 |
| 3 | Test Scavenger | 500 | 360 |

In the first run, an additional sample was tested with a 200 ppm dose of the test scavenger. After four hours at 65° C., the hydrogen sulfide content was measured at 100 ppm. A similar rerun of Run 3 resulted in a hydrogen sulfide content of 550 ppm.

EXAMPLE 9

Bottle tests were conducted on various scavengers in doped kerosine containing 76 ppm H₂S in the liquid phase. The Comparison Scavenger of the previous examples was tested as were samples of another comparison scavenger, identified here as Scavenger 1, prepared from 2-ethyl-2-hexenal and octylamine, and Test Scavenger A, prepared by adding n-butyraldehyde (500 g) to monoethanolamine (211 g) over a period of three hours while maintaining the temperature below 45° C. and carrying out the reaction for four hours at 90°–105° C. while withdrawing water (154.6 g). The following results were obtained with 200 ppm scavenger doses and after 12 hours at 60° C., with the final H₂S content being given in ppm.

| Scavenger | Final H₂S Content | % H₂S Reduction |
| --- | --- | --- |
| None | 76 | 0 |
| Comparison Scavenger | 52 | 32 |
| Scavenger 1 | 73 | 4 |
| Test Scavenger A | 2 | 97 |

The test was rerun at 150° F. to 160° F. and 200 ppm scavenger in kerosine containing H₂S. The results, after 18 hours, were as follows:

| Scavenger | H₂S ppm | H₂S Removed ppm (%) |
| --- | --- | --- |
| None | 39 | — |
| Comparison Scavenger | 20 | 19 (49%) |
| Scavenger 1 | 27 | 12 (31%) |
| Test Scavenger A | 15 | 24 (62%) |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for scavenging elemental sulfur from a petroleum-derived fluid medium, the method comprising contacting the medium with an elemental sulfur scavenging amount of an imine of the formula

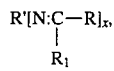

wherein x is an integer from 1 to 10, R' is an organic moiety having a number of valences equal to x, R₁ is selected from the group consisting of hydrogen and mono-valent organic moieties and R is a mono-valent olefin moiety, provided that R and R₁ contain a total of from about four to about forty carbon atoms, the imine thereby scavenging elemental sulfur in the medium.

2. A method as set forth in claim 1 wherein x is an integer of from one to four, R' is an organic moiety of from one to about eighteen carbon atoms.

3. A method as set forth in claim 2 wherein R is an olefin in which one or more hydrogen is optionally substituted with a hydroxyl, ether, ester or tertiary nitrogen group and R₁ is hydrogen or an aliphatic hydrocarbon in which one or more hydrogen is optionally substituted with a hydroxyl group.

4. A method as set forth in claim 1, wherein R is selected from the group consisting of (a)

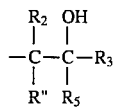

and (b)

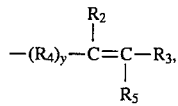

wherein y is 0 or 1, R", R₁, R₂, R₃ and R₅ are independently selected from the group consisting of hydrogen and mono-valent organic moieties, and R$_4$ is a di-valent organic moiety, and if R corresponds to structure (a), at least one of R", R$_1$, R$_2$, R$_3$ and R$_5$ is an olefin moiety.

5. A method as set forth in claim 4 wherein x is an integer from 1 to 4, R' is an organic moiety of from 1 to about 18 carbon atoms and R", R$_1$, R$_3$, R$_3$ and R$_5$ are independently selected from the group consisting of hydrogen and organic moieties of up to about 18 carbon atoms and R$_4$ contains at most about six carbon atoms.

6. A method as set forth in claim 5 wherein the imine contains at most about thirty carbon atoms.

7. A method as set forth in claim 6 wherein R', R$_1$, R$_2$, R$_3$ and R$_5$ are independently selected from the group consisting of hydrogen, alcohols and alkyls and R$_4$ contains is selected from the group consisting of alkylenes and di-valent alkenes.

8. A method as set forth in claim 5 wherein R corresponds to structure (b), y is 1 and R$_4$ corresponds to the formula :C(R$_6$)(R$_7$), wherein R$_6$ and R$_7$ are independently selected from the group consisting of hydrogen and organic moieties.

9. A method as set forth in claim 8 wherein R$_6$ and R$_7$ are independently selected from the group consisting of hydrogen, alcohols, alkenyls and alkyls of up to about six carbon atoms.

10. A method as set forth in claim 7 wherein R' is an alcohol and R$_1$, R$_2$, R$_3$ and R$_5$ are independently selected from the group consisting of hydrogen and alkyls.

11. A method as set forth in claim 5 wherein R corresponds to structure (b).

12. A method as set forth in claim 11 wherein the imine contains at most about thirty carbon atoms.

13. A method as set forth in claim 12 wherein R', R$_1$, R$_2$, R$_3$ and R$_5$ are independently selected from the group consisting of hydrogen, alcohols and alkyls and R$_4$ contains is selected from the group consisting of alkylenes and di-valent alkenes.

14. A method as set forth in claim 5 where R corresponds to structure (a).

15. A method as set forth in claim 14 wherein the imine contains at most about thirty carbon atoms.

16. A method as set forth in claim 15 wherein R', R$_1$, R$_2$, R$_3$ and R$_5$ are independently selected from the group consisting of hydrogen, alcohols and alkyls and R$_4$ contains is selected from the group consisting of alkylenes and di-valent alkenes.

17. A method for scavenging elemental sulfur from a petroleum-derived fluid medium, the method comprising adding to the medium an effective amount of a composition produced by a condensation reaction between an amine having at least one primary amino group and a carbonyl of the formula $$R_1CR'$$
$$\overset{O}{\overset{\|}{\phantom{X}}}$$

wherein R$_1$ is selected from the group consisting of hydrogen and mono-valent organic moieties and R is a mono-valent olefin moiety, provided that R and R$_1$ contain a total of from about four to about forty carbon atoms, the imine thereby scavenging elemental sulfur in the medium.

18. A method as set forth in claim 17 wherein R is selected from the group consisting of (a)

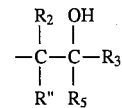

and (b)

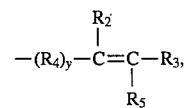

wherein y is 0 or 1, R", R$_1$, R$_2$, R$_3$ and R$_5$ are independently selected from the group consisting of hydrogen and mono-valent organic moieties, and R$_4$ is a di-valent organic moiety, and if R corresponds to structure (a), at least one of R", R$_1$, R$_2$, R$_3$ and R$_5$ is an olefin moiety.

19. A method as set forth in claim 18, wherein R corresponds to structure (a) and the carbonyl was produced by an aldol condensation reaction of aldehydes having one alpha hydrogen.

20. A method for scavenging elemental sulfur from a petroleum-derived fluid medium, the method comprising adding to the medium an effective amount of a composition produced by a condensation reaction between an amine having at least one primary amino group and an aldehyde having at least one alpha-hydrogen in an aldehyde to primary amino group molar ratio of at least about 2:1, the imine thereby scavenging elemental sulfur in the medium.

21. A method as set forth in claim 20 wherein the amine is selected from the group consisting of monoamines and polyamines of the formula R'(NH$_2$)$_x$, wherein x is an integer from 1 to 10 and R' is an organic mono- or poly-valent moiety in which the number of valences equals x.

22. A method as set forth in claim 21 wherein x is an integer from 1 to 4, R' is an organic moiety of from 1 to about 12 carbon atoms and the aldehyde is of the formula R$_2$CH$_2$CHO wherein R$_2$ is selected from the group consisting of hydrogen and organic moieties of up to about 12 carbon atoms.

23. A method as set forth in claim 22 wherein R' is a hydrocarbon or alcohol moiety and R$_2$ is selected from the group consisting of hydrogen and hydrocarbon moieties of up to about 12 carbon atoms.

24. A method as set forth in claim 23 wherein x is 1 and R' is a hydrocarbon or hydroxyalkyl moiety of up to about 6 carbon atoms.

25. A method as set forth in claim 24 wherein R' is HOCH$_2$CH$_2$—, R$_1$ is hydrogen and R$_2$ is CH$_3$CH$_2$—.

* * * * *